United States Patent
Fu

(10) Patent No.: US 11,953,515 B2
(45) Date of Patent: Apr. 9, 2024

(54) METHOD FOR COMPUTING ANGULAR VELOCITY AND SYSTEM FOR USING THE SAME

(71) Applicant: STMicroelectronics (China) Investment Co. Ltd., Shanghai (CN)

(72) Inventor: Daopeng Fu, Shanghai (CN)

(73) Assignee: STMicroelectronics (China) Investment Co., Ltd., Shanghai (CN)

( * ) Notice: Subject to any disclaimer, the term of this patent is extended or adjusted under 35 U.S.C. 154(b) by 0 days.

(21) Appl. No.: 17/651,451

(22) Filed: Feb. 17, 2022

(65) Prior Publication Data

US 2023/0258682 A1    Aug. 17, 2023

(51) Int. Cl.
*G01P 3/44* (2006.01)
*G01P 1/08* (2006.01)

(52) U.S. Cl.
CPC . *G01P 3/44* (2013.01); *G01P 1/08* (2013.01)

(58) Field of Classification Search
CPC ....................................................... G01P 3/44
USPC ........................................................ 73/493
See application file for complete search history.

(56) References Cited

U.S. PATENT DOCUMENTS

| | | | |
|---|---|---|---|
| 5,903,224 A | 5/1999 | Reynolds | |
| 6,072,386 A | 6/2000 | Yu | |
| 6,265,984 B1 | 7/2001 | Molinaroli | |
| 7,477,208 B2 | 1/2009 | Matlock et al. | |
| 8,830,045 B2 | 9/2014 | Goldwater | |
| 10,101,355 B2 | 10/2018 | Takayama et al. | |
| 10,209,268 B2* | 2/2019 | Kaufner | G01D 5/24476 |
| 10,989,730 B2 | 4/2021 | Corno et al. | |
| 2010/0001720 A1* | 1/2010 | Mizutani | F16C 33/723 |
| | | | 324/207.25 |
| 2015/0367176 A1 | 12/2015 | Bejestan et al. | |
| 2016/0140936 A1* | 5/2016 | Gilbert | G09F 21/045 |
| | | | 345/419 |
| 2016/0298983 A1* | 10/2016 | Savchenko | G01C 19/56 |

FOREIGN PATENT DOCUMENTS

| | | | |
|---|---|---|---|
| CN | 101673495 A | 3/2010 | |
| CN | 202067506 U | 12/2011 | |
| CN | 107507548 A | 12/2017 | |
| FR | 2990027 A1 * | 11/2013 | G01P 15/18 |

OTHER PUBLICATIONS

Barraud et al. Machine Translation of FR2990027A1. Published Nov. 2013. Translated Mar. 2023. (Year: 2013).*

* cited by examiner

*Primary Examiner* — Walter L Lindsay, Jr.
*Assistant Examiner* — Philip T Fadul
(74) *Attorney, Agent, or Firm* — Slater Matsil, LLP

(57) ABSTRACT

A method of processing information of a rotating wheel includes measuring angular velocity of a rotating wheel with a gyroscopic sensor, determining an instantaneous position of the rotating wheel with an accelerometer, and determining the angular positions of the rotating wheel based on the measured angular velocity and the instantaneous position of the rotating wheel. The gyroscopic sensor and the accelerometer are mounted on the rotating wheel.

20 Claims, 14 Drawing Sheets

US 11,953,515 B2

METHOD FOR COMPUTING ANGULAR VELOCITY AND SYSTEM FOR USING THE SAME

TECHNICAL FIELD

The present disclosure relates generally to a system and method for displaying information on a rotating wheel, and in particular embodiments, to a system that provides real-time position information of a rotating wheel based on signals of an accelerometer sensor and a gyroscopic sensor.

BACKGROUND

Displaying images on a wheel of a vehicle, e.g. a bicycle, is useful for reasons such as increasing the visibility of the vehicle to drivers on the same road and for displaying advertisements. The display technique may use the rotation of the wheel and the persistence of vision effect to create the images. Lights such as light-emitting diodes (LEDs) are coupled to one or more spokes of the wheel. The lights are turned on and off during rotation of the wheel to create an image for observers. The image may include any combination of letters, numbers, pictures, or visual designs. The image may be stationary or animated with respect to the reference frame of the wheel. The image may be two-dimensional or three-dimensional.

Turning the lights on and off in conjunction with rotation of the wheel generates the image for observers. However, the angular velocity of the wheel will change with the speed of the vehicle. This may vary as the user of the vehicle responds to road conditions (e.g., a bicyclist may pedal slower going up a hill and may allow the bicycle to accelerate faster going down the hill). As such, accurate instantaneous measurement of the angular velocity and position of the wheel is necessary to display the image without distortions or inaccuracies.

SUMMARY

In accordance with an embodiment, a method of processing information of a rotating wheel includes: measuring angular velocity of a rotating wheel with a gyroscopic sensor, the gyroscopic sensor being mounted on the rotating wheel; determining an instantaneous position of the rotating wheel with an accelerometer, the accelerometer being mounted on the rotating wheel; and determining the angular positions of the rotating wheel based on the measured angular velocity and the instantaneous position of the rotating wheel.

In accordance with another embodiment, a vehicle includes: a wheel configured to be rotated; a gyroscopic sensor coupled to the wheel; an accelerometer coupled to the wheel; and a controller connected to the gyroscopic sensor and the accelerometer, where the controller is configured to: take measurements of an angular velocity of the wheel with respect to time using the gyroscopic sensor; take measurements of gravitational acceleration of the wheel with respect to time using the accelerometer; and calculate an angular position of the wheel using the measurements of the angular velocity of the wheel with respect to time, where the controller corrects an angle error in the measurements of the angular position using the measurements of the gravitational acceleration of the wheel.

In accordance with yet another embodiment, a display includes: a wheel configured to be rotated around an axis perpendicular to a rotating plane; a plurality of light emitting circuits attached to the wheel; a gyroscopic sensor mounted on the wheel and configured to measure angular velocity of the wheel while the wheel is being rotated; an accelerometer mounted on the wheel and configured to measure acceleration of the wheel while the wheel is being rotated; and a controller programmed to: determine zero-crossings of a value of the acceleration resolved along the rotating plane; determine the angular position of the wheel based on the measured angular velocity and the zero-crossings; and set a display property of the plurality of light emitting circuits based on the angular position.

It is to be understood that both the foregoing general description and the following detailed description are exemplary and explanatory only and are not restrictive of the disclosure, as claimed.

BRIEF DESCRIPTION OF THE DRAWINGS

For a more complete understanding of the present invention, and the advantages thereof, reference is now made to the following descriptions taken in conjunction with the accompanying drawings, in which.

Figure 1A:
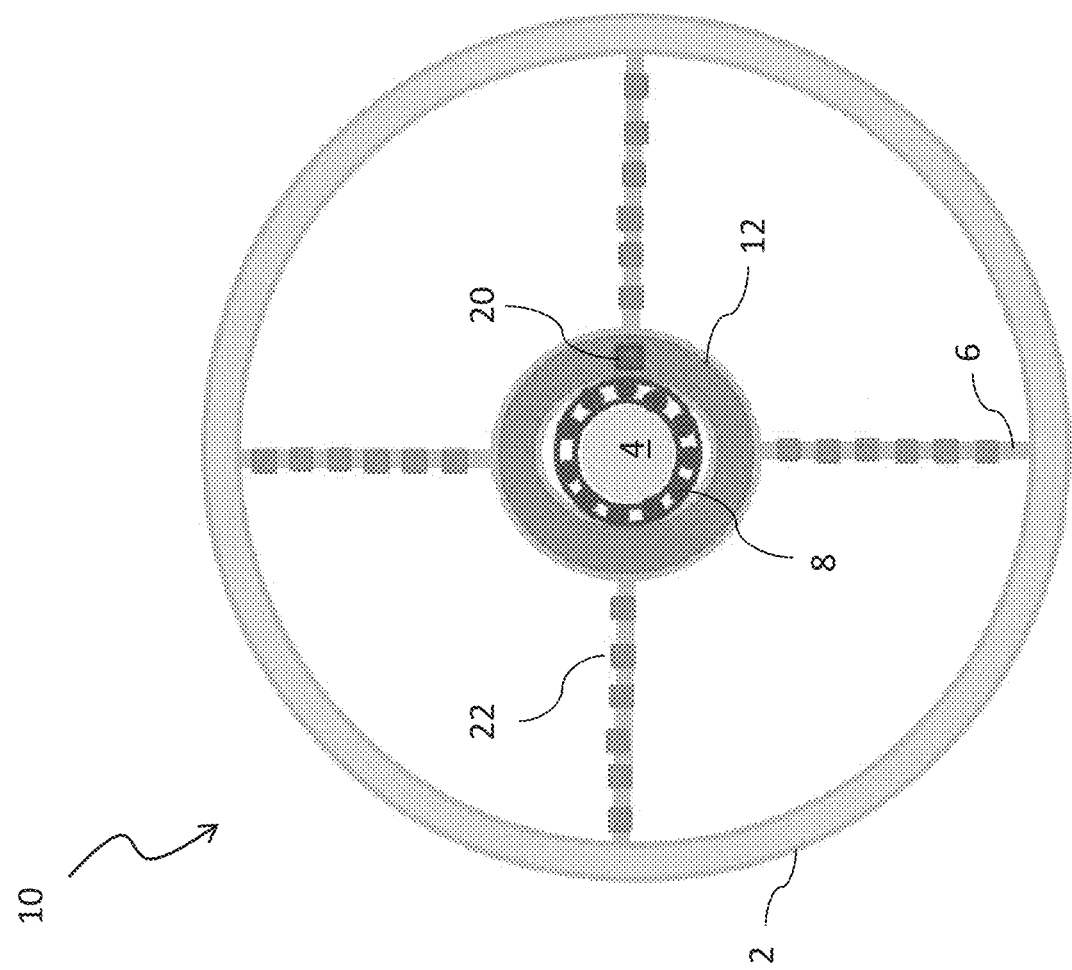
FIGS. 1A and 1B illustrate side views of a wheel, in accordance with some embodiments.

Corresponding numerals and symbols in the different figures generally refer to corresponding parts unless otherwise indicated. The figures are drawn to clearly illustrate the relevant aspects of the embodiments and are not necessarily drawn to scale. The edges of features drawn in the figures do not necessarily indicate the termination of the extent of the feature.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

While inventive aspects are described primarily in the context of a positioning algorithm operating within an image display system in a bicycling application, the inventive aspects may be similarly applicable to other systems and other applications.

The references used herein are provided merely for convenience and hence do not define the extent of protection or the scope of the embodiments. It is desirable to be able to measure the angular velocity and position of a rotating wheel for applications such as displaying an image on the rotating wheel. A gyroscopic sensor may be used to measure the angular velocity of the rotating wheel, and the angular velocity may be integrated to find the angular position of the rotating wheel. However, angle errors in the angular velocity measurements of the gyroscopic sensor may add up cumulatively and lead to large errors in the computed angular position, which can lead to distortions in the displayed image. While solutions including, e.g., magnets and Hall sensors have been used to correct for the cumulative angle error of the gyroscopic sensor, the inclusion of magnets and Hall sensors undesirably increases the complexity and cost of the image display system.

Embodiments of the disclosure provide solutions to problems outlined above by providing a method by which the angular position of the rotating wheel is found with a system including two sensors (e.g., a gyroscopic sensor and an accelerometer). The inclusion of other sensors or apparatuses such as Hall sensors and magnets is not necessary as the cumulative angle error from the angular velocity measurements of the gyroscopic sensor is corrected by using measurements from the accelerometer. This allows for a simpler image display system including fewer pails, decreasing costs.

FIG. 1A illustrates a side view of a wheel 10, in accordance with some embodiments. The wheel 10 is configured to rotate around an axis perpendicular to a rotating plane. The wheel 10 may be part of a vehicle such as a bicycle, automobile, truck, motorcycle, or the like. The wheel 10 includes a rim 2 coupled to a hub 4 by spokes 6. Although the wheel 10 is illustrated with four spokes 6, any suitable number of spokes may be used. The rim 2 may include a tire suitable for rolling on roads, sidewalks, or the like. The hub 4 may include a bearing 8 to allow the hub 4 to rotate freely around an axle (not illustrated).

An array of lights 22 are coupled to the wheel 10. The array of lights 22 may be configured to display images when the wheel 10 is rotating by using the persistence of vision effect. The array of lights 22 may be mounted on one or more of the spokes 6. The array of lights 22 may include light emitting circuits such as LEDs. When the wheel 10 is rotating with a sufficient velocity, lights of the array of lights 22 are activated and deactivated to display an image to a human observer by taking advantage of the visual persistence time of the human eye, which may be in a range of $\frac{1}{30}$ seconds to $\frac{1}{16}$ seconds.

A controller 12 is connected to the array of lights 22. The controller 12 includes a microcontroller, microprocessor, processor, or the like. The controller 12 executes programming for the array of lights 22, such as setting a display pattern for the array of lights 22. In various embodiments, the controller 12 includes a ring-type printed circuit board (PCB) and is coupled to the hub 4 around the bearing 8. In some embodiments, the controller 12 is mounted elsewhere on the vehicle (e.g., on the handlebars of a bicycle or integrated with the CPU of an automobile's drive system).

A sensor 20 is mounted on the wheel 10. The sensor 20 is configured to measure the angular position and angular velocity of the wheel 10 while in rotation. In various embodiments, the sensor 20 is mounted on the ring-type PCB of the controller 12. In some embodiments, the controller 12 is mounted elsewhere on the vehicle and the sensor 20 is coupled to the wheel 10.

Figure 1B:
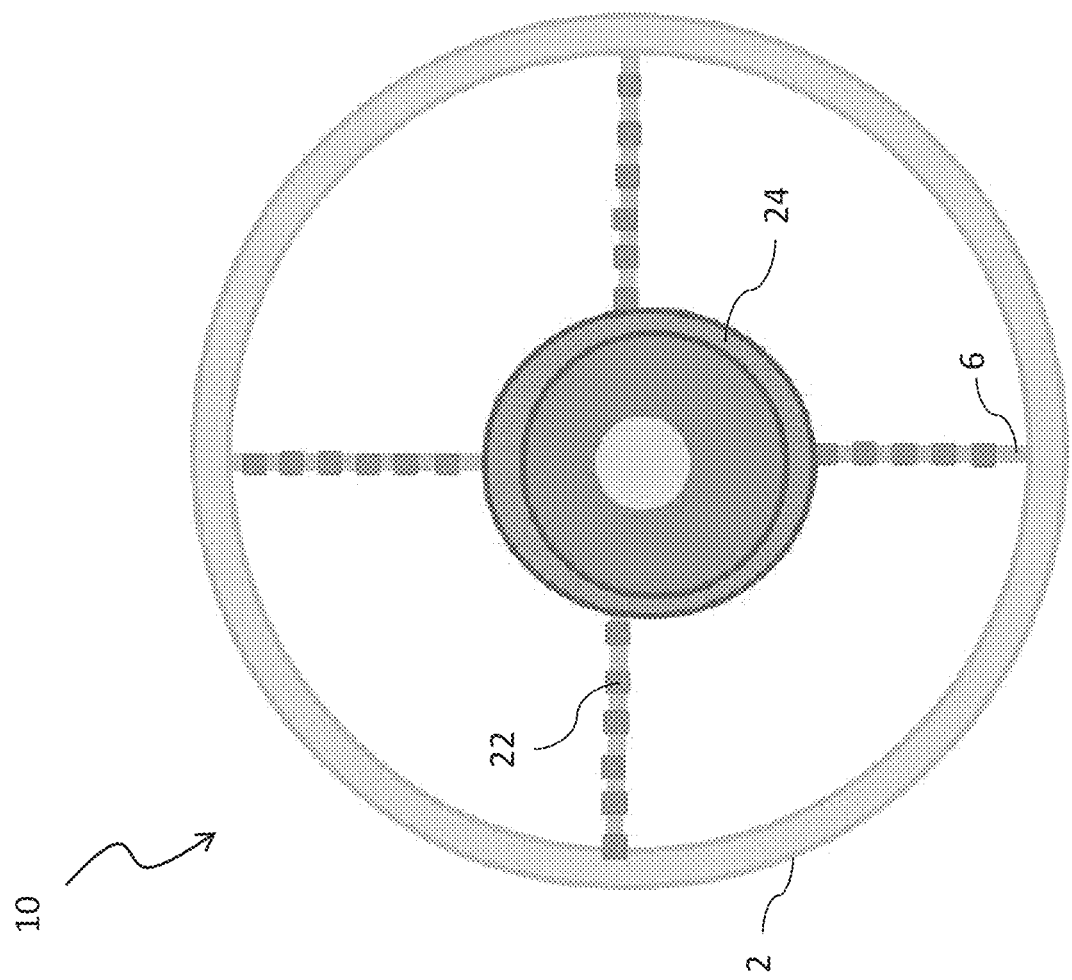

FIG. 1B illustrates a side view of the wheel 10 with a cap 24 covering the center of the wheel 10. The cap 24 covers the controller 12 and the sensor 20. This may protect the controller 12 and the sensor 20 from damage and may weather seal the controller 12 and the sensor 20, for example, to be water proof. The cap 24 may be a dome of a suitable material such as plastic, metal, or the like. The cap 24 may be secured to the wheel 10 by any suitable method, such as plastic or metal tabs, snaps, screws, bolts, or the like.

Figure 2A:
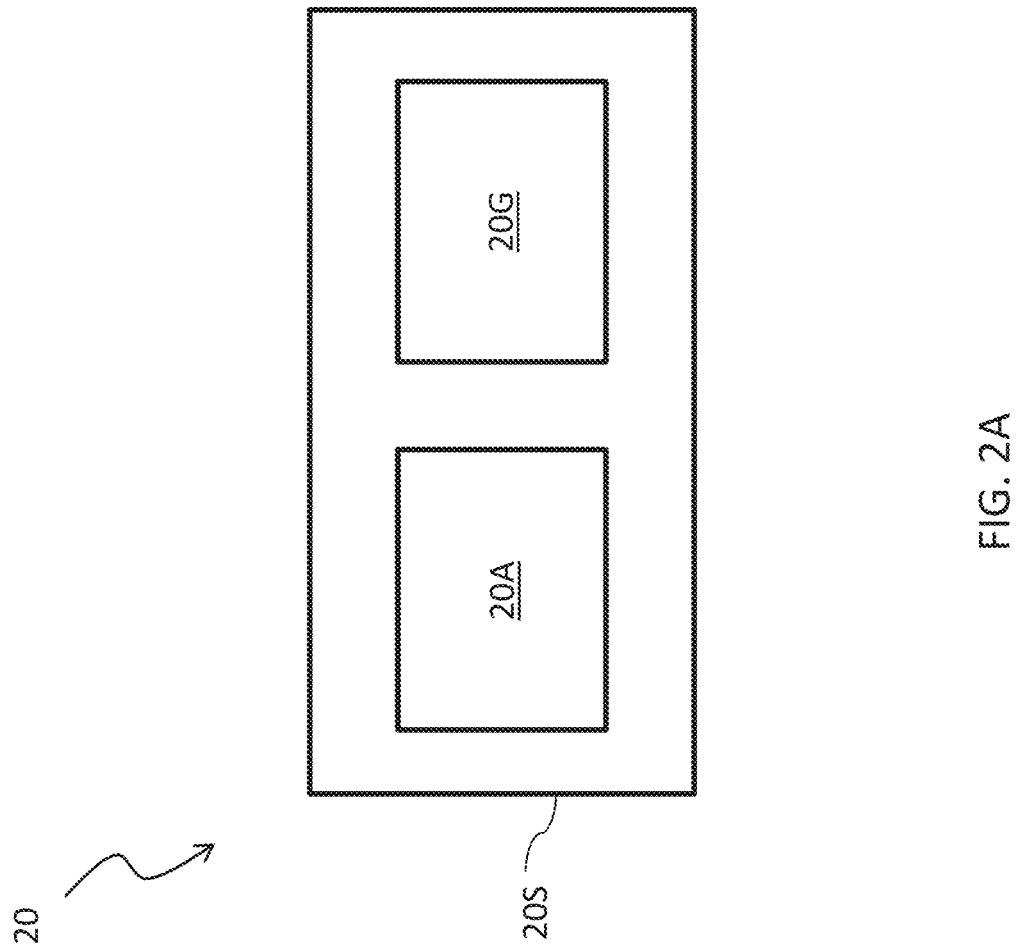
FIG. 2A illustrates a top view of a sensor, in accordance with some embodiments.

FIG. 2A illustrates a top view of the sensor 20, in accordance with some embodiments. The sensor 20 may be an inertial measurement unit (IMU). The sensor 20 includes an accelerometer 20A (see below, FIG. 2B) and a gyroscopic sensor 20G. The accelerometer 20A and the gyroscopic sensor 20G may be mounted on a substrate 20S, such as a printed circuit board (PCB). The accelerometer 20A and the gyroscopic sensor 20G may be located at different locations on the substrate 20S in some embodiments. For example, these may be located at opposite ends to even out the weight distribution especially for certain applications in which the rotating element (wheel 10) is very light. In some embodiments, the sensor 20 is free of magnetometers, magnetic sensors, Hall sensors, and the like. The controller 12 is programmed with a positioning algorithm that finds the angular position of the rotating wheel 10 with the accelerometer 20A and the gyroscopic sensor 20G, without a need for data from a magnetic sensor. This allows for a simpler design of the sensor 20 to be used, decreasing costs.

The gyroscopic sensor 20G provides measurements of instantaneous angular velocity of the rotating wheel 10, which are used in conjunction with data from the accelerometer 20A to determine the angular position of the rotating wheel 10. In some embodiments, the gyroscopic sensor 20G is a microelectromechanical system (MEMS) gyroscopic sensor, such as a vibrating structure MEMS gyroscopic sensor. However, any suitable gyroscopic sensor 20G may be used.

Figure 2B:
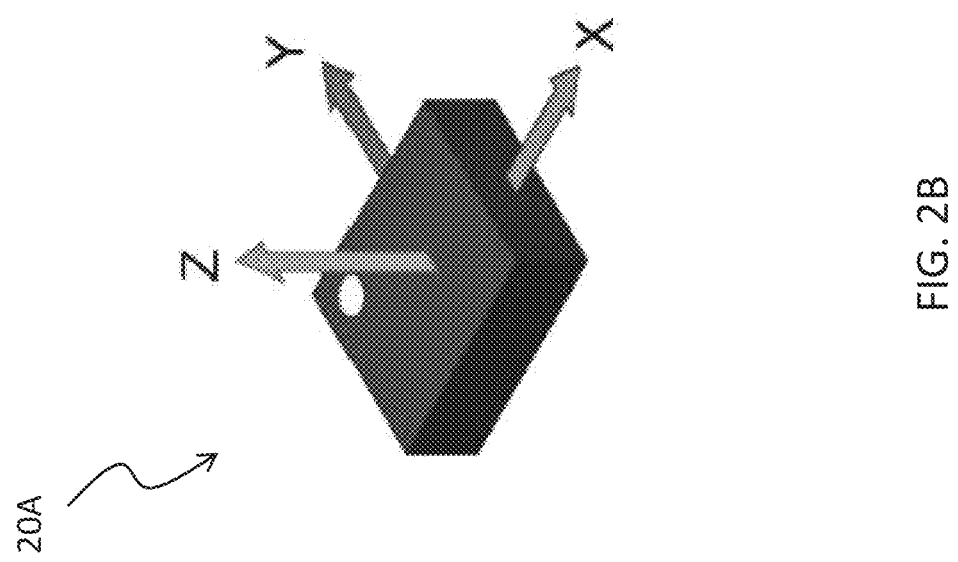
FIG. 2B illustrates a perspective view of an accelerometer, in accordance with some embodiments.

FIG. 2B illustrates a perspective view of the accelerometer 20A, in accordance with some embodiments. In various embodiments, the accelerometer 20A is a three-axis accelerometer that measures proper acceleration (the acceleration of the accelerometer 20A in its own instantaneous rest frame) along an x-axis, a y-axis, and a z-axis. In certain embodiments, the accelerometer 20A is a two-axis accelerometer especially when the accelerometer 20A is attached to the plane of the wheel 10. In a reference frame stationary with respect to the earth, the accelerometer will measure a proper acceleration of 1 g (9.81 m/s$^2$) towards the center of the earth. The accelerometer 20A may be a MEMS accelerometer using electrical, piezoelectric, piezoresistive, or capacitive measurement. However, any suitable accelerometer 20A may be used.

Figure 3A:
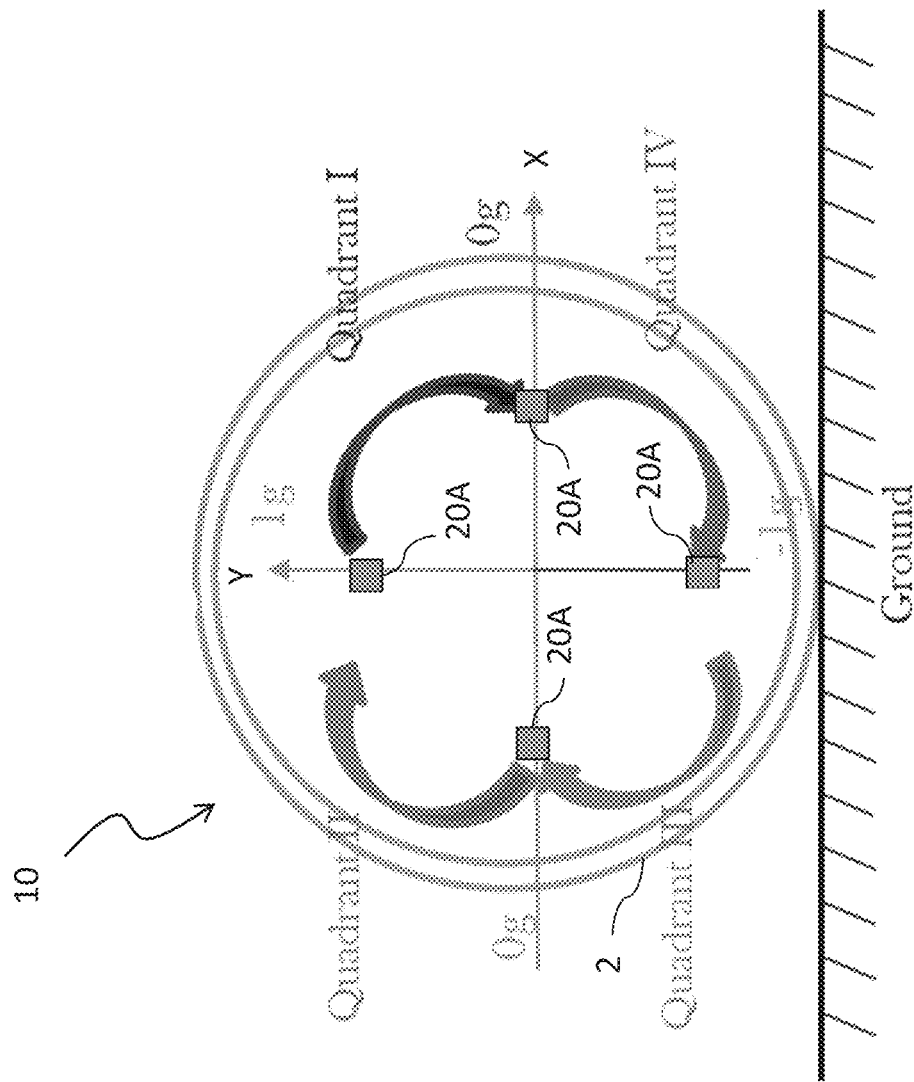
FIG. 3A illustrates a side view of a wheel, in accordance with some embodiments.

FIG. 3A illustrates a side view diagram of the wheel 10 showing positions of the accelerometer 20A and respective values of the measured acceleration of the accelerometer 20A while the wheel is stationary. The wheel 10 is oriented in an XY plane, with the origin at the center of the wheel 10 and the z-axis being perpendicular to the page and facing outward. The wheel 10 is configured to rotate clockwise around the z-axis, which is perpendicular to the XY plane. The XY plane of the wheel 10 is divided into four quadrants, as per the Cartesian system.

The accelerometer 20A is mounted on the wheel 10 between the center of the wheel 10 and the rim 2, such as on the ring-type PCB of the controller 12 (see above, FIG. 1A). As an example, the accelerometer 20A may be positioned on the wheel 10 so that the x-axis of the accelerometer 20A (see above, FIG. 2A) is parallel with the y-axis of the wheel 10 when the accelerometer is in a top position shown in FIG. 3A at the boundary of Quadrants I and II. When the wheel 10 is stationary with respect to the reference frame of the earth, the accelerometer 20A will experience a total acceleration of 1 g in a direction towards the center of the earth, which is along the negative x-axis. The accelerometer 20A will then register an acceleration of 1 g in the x direction of the accelerometer 20A. As the wheel 10 rotates in a clockwise direction, the trend of the acceleration measured along the x-axis of the accelerometer 20A in Quadrant I is from +1 g to 0 g, the trend of the acceleration measured along the x-axis of the accelerometer 20A in Quadrant II is from 0 g to +1 g, the trend of the acceleration measured along the x-axis of the accelerometer 20A in Quadrant III is from −1 g to 0 g, and the trend of the acceleration measured along the x-axis of the accelerometer 20A in Quadrant IV is from 0 to −1 g. When the accelerometer 20A is located at the boundary of Quadrants I and IV, the accelerometer 20A will register an acceleration of 0 g in the x direction. When the accelerometer 20A is located at a bottom position at the boundary of Quadrants III and IV, the accelerometer 20A will register an acceleration of −1 g in the x direction. And when the accelerometer 20A is located at the boundary of Quadrants II and III, the accelerometer 20A will register an acceleration of 0 g in the x direction. As such, the horizontal position of the accelerometer 20A and the horizontal position of the wheel 10 on which the accelerometer 20A is mounted with respect to a plane tangent to the surface of the earth may be found by measuring the acceleration of the accelerometer 20A in the x direction.

Figure 3B:
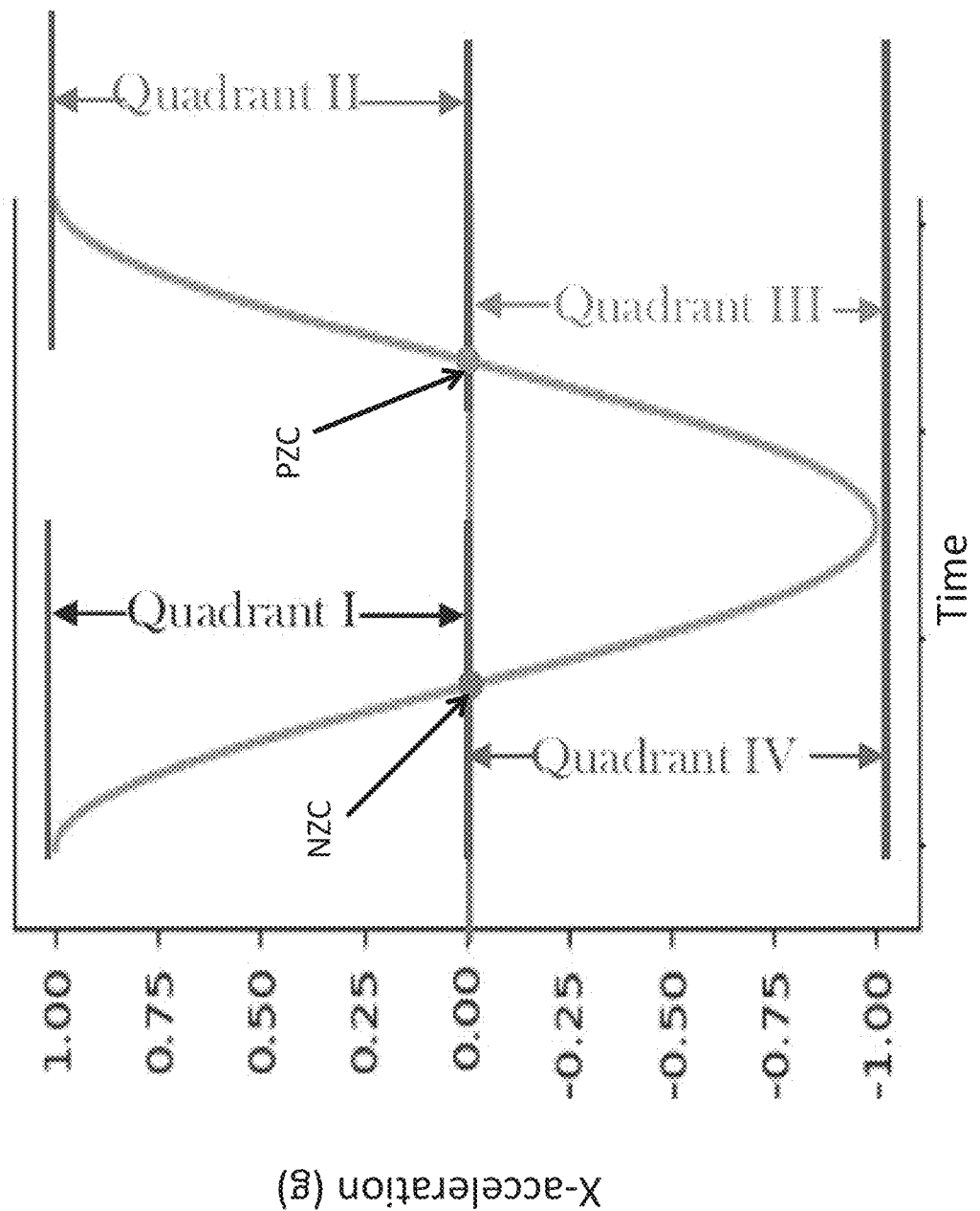
FIG. 3B illustrates acceleration measured by an accelerometer, in accordance with some embodiments.

FIG. 3B illustrates a graph of the acceleration in the x-direction (also referred to as the x-acceleration) measured by the accelerometer 20A as the wheel 10 rotates in a clockwise direction. The x-acceleration per time is a cosine wave, beginning at +1 g when the accelerometer 20A is at the top position, decreasing to −1 g as the wheel 10 rotates the accelerometer 20A to the bottom position, and increasing back to +1 g as the wheel 10 rotates the accelerometer 20A back up to the top position. As an approximation, the acceleration due to the rotation of the wheel 10 is neglected in FIG. 3B. In other words, the x-acceleration is plotted as if the wheel 10 were instantaneously stationary at each measurement sample taken by the accelerometer 20A.

The measured x-acceleration of the accelerometer 20A provides a method to determine a reference point for the angular position of the wheel 10. When the accelerometer 20A passes from Quadrant I to Quadrant IV and when the accelerometer 20A passes from Quadrant III to Quadrant II, the value of the x-acceleration changes sign. The points where the value of the x-acceleration changes sign may be referred to as zero-crossings. For example, the point when the accelerometer 20A passes from Quadrant I to Quadrant IV may be referred to as a negative zero-crossing (NZC) and the point when the accelerometer 20A passes from Quadrant III to Quadrant II may be referred to as a positive zero-crossing (PZC). The negative zero-crossings, the positive zero-crossings, or both may be used as reference points to establish the angular position of the wheel 10. In following embodiments, negative zero-crossings are used as reference points for the angular position of the wheel 10. In some embodiments, positive zero-crossings are used as reference points, or both negative zero-crossings and positive zero-crossings are used as reference points.

When the wheel 10 is rotating, the rotational motion will cause the accelerometer 20A to experience a non-gravitational acceleration that will distort and add jitter to the x-acceleration curve illustrated in FIG. 3B. The components of the measured acceleration due to the rotational motion of the wheel 10 are desirably removed in order to use the zero-crossings as reference points for the angular position of the wheel 10. These components may be removed a data-processing technique such as filtering.

Figure 4:
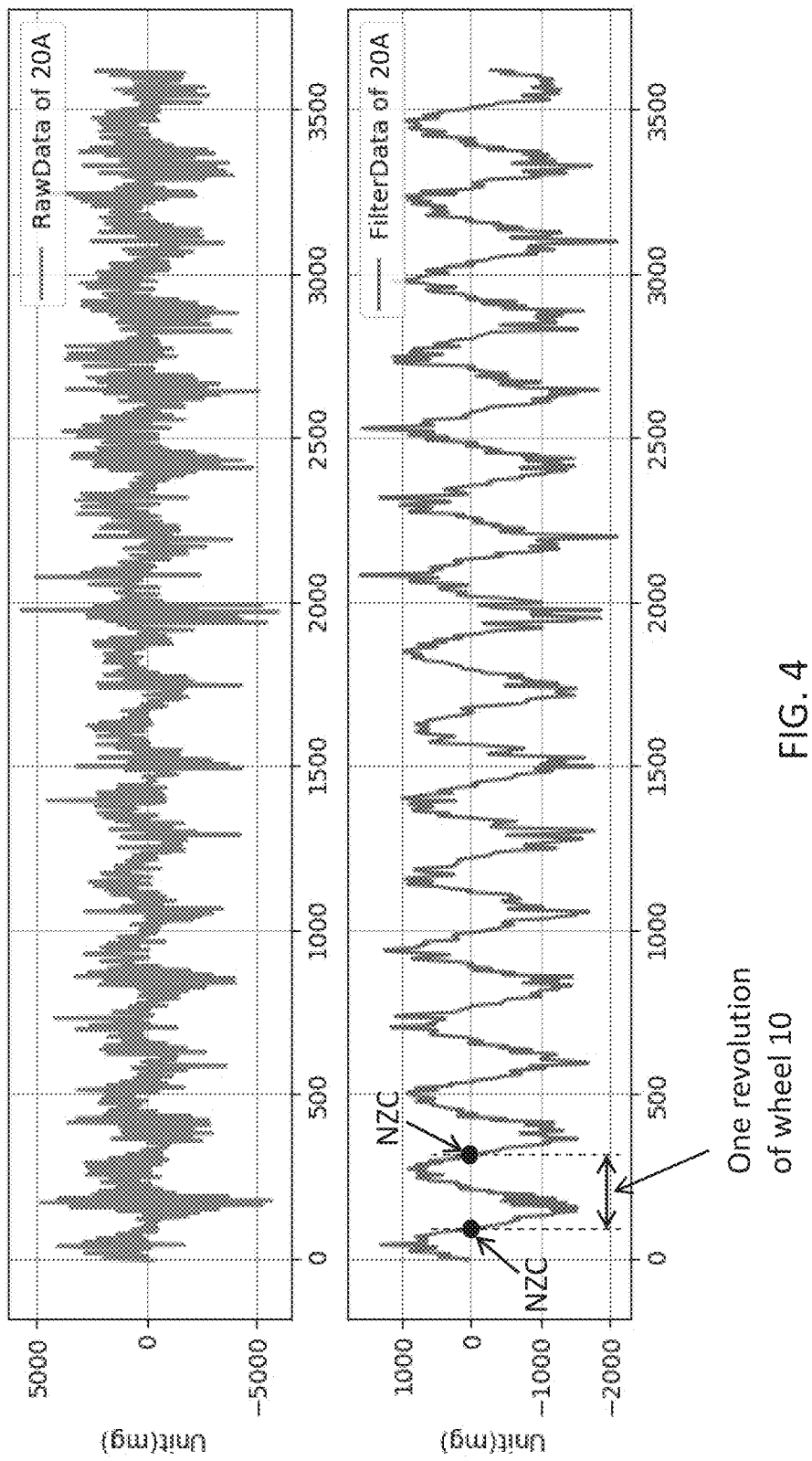
FIG. 4 illustrates data from an accelerometer, in accordance with some embodiments.

FIG. 4 illustrates raw data of measured x-acceleration from an accelerometer 20A coupled to a wheel 10 while the wheel 10 is rotating and filtered data of the measured x-acceleration, in accordance with some embodiments. The measured x-acceleration is displayed in units of mg (e.g., the proof mass of the accelerometer multiplied by gravitational acceleration). The acceleration that the accelerometer 20A experiences because of the rotation of the wheel 10 significantly distorts the x-acceleration from the sinusoidal signal of gravitational acceleration (see above, FIG. 3B) and produces jitter around the zero-crossings. As such, the negative zero-crossings and positive zero-crossings may be difficult to identify in the raw data of the measured x-acceleration.

A filtering algorithm can be used to filter the raw data of the measured x-acceleration and extract the sinusoidal signal due to the gravitational acceleration. The x-acceleration on the accelerometer 20A due to the rotation of the wheel 10 is rapidly changing in direction. As such, the components of the x-acceleration due to the rotation of the wheel 10 will have higher frequencies than the sinusoidal signal of gravitational acceleration. A low-pass filter is implemented as programming on the controller 12 to remove the high frequency components of the raw data of the measured x-acceleration. The low-pass filter may be programmed to remove components of the measured x-acceleration with frequencies greater than a cut-off frequency of, for example, 10 Hz. The cut-off frequency of the low-pass filter may be adjusted according to the operational situation of the wheel 10. In some embodiments, an infinite impulse response (IIR) filter is used to filter the raw data of the measured x-acceleration. However, any suitable filtering technique may be used to remove the high frequency components due to the rotation of the wheel 10. For example, any smoothing operation may be used for this filtering process.

FIG. 4 further illustrates the filtered data of the measured x-acceleration from the accelerometer 20A after the raw data is filtered by a low-pass filtering algorithm. The distortion of the sinusoidal signal due to gravitational acceleration and jitter around the crossing of the zero line is removed, so the zero-crossings are identifiable. Consecutive negative zero-crossings indicate start and end points of each revolution of the wheel 10. Negative zero-crossings in the filtered data of the measured x-acceleration from an accelerometer 20A may be used as reference points for the angular position of the wheel 10 at the point in time where the negative zero-crossings are observed. In some embodiments, positive zero-crossings are used as reference points for the angular position of the wheel 10. Angle errors in the angular position of the rotating wheel 10 may be reduced by using the zero-crossings as reference points for integrating the angular velocity found by the gyroscopic sensor 20G.

Figure 5:
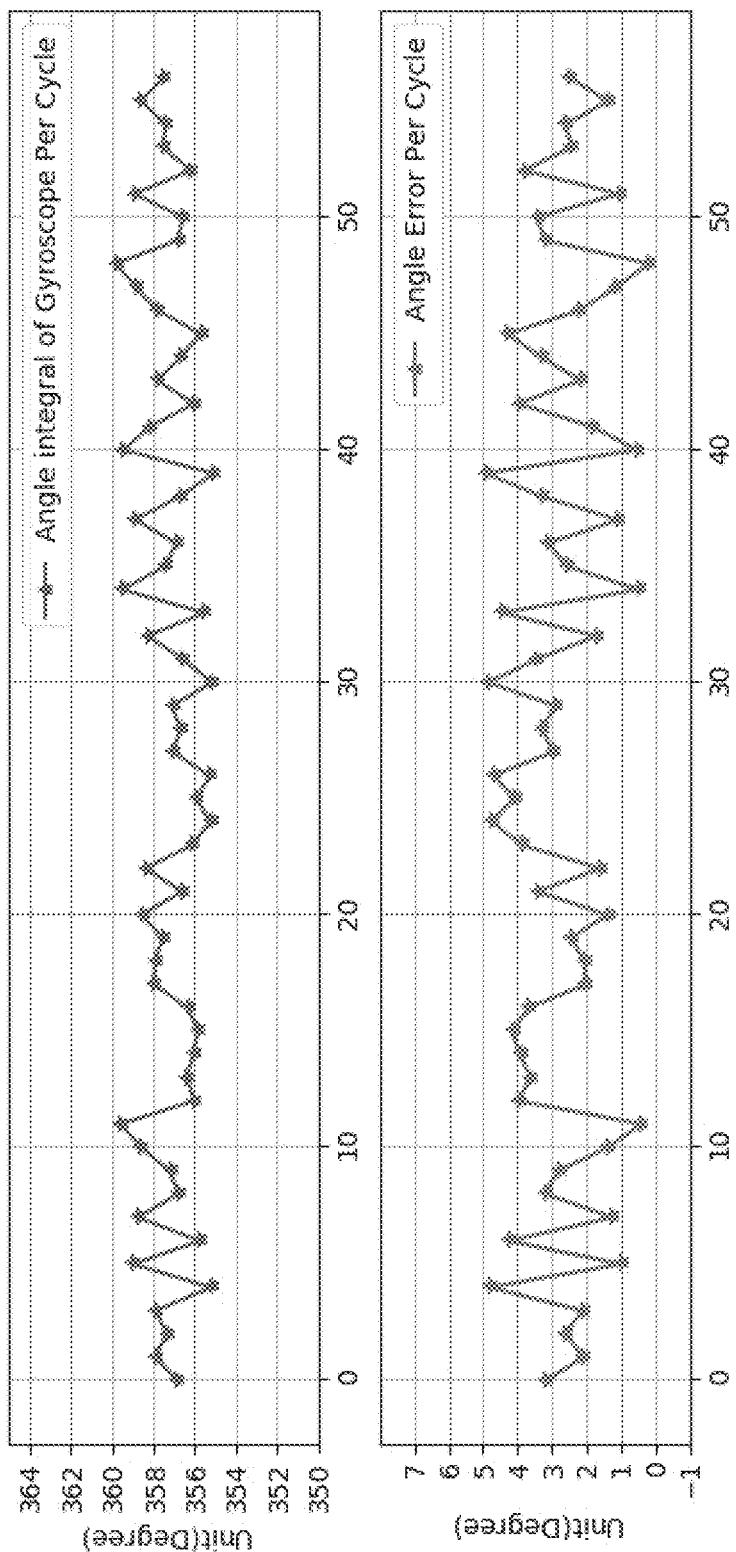
FIG. 5 illustrates angle integrals and angle errors of data from a gyroscopic sensor, in accordance with some embodiments.

FIG. 5 illustrates the angle integrals of angular velocity measured by the gyroscopic sensor 20G (also referred to as a gyroscope) for each cycle (revolution) of the rotating wheel 10 and the angle error of the angle integrals per cycle, in accordance with some embodiments. The controller 12 is programmed to use the zero-crossings (e.g., the negative zero-crossings) as reference points for the start and end points of each cycle of the wheel 10. The controller 12 then integrates measurements of the angular velocity of the rotating wheel 10 from the gyroscopic sensor 20G to find the angular position of the wheel 10 per time.

In a system without errors, the angle integral of the measurements of the angular velocity from the gyroscopic sensor 20G would be 360 degrees for each cycle. However, in a real system, small errors in measurements of the angular velocity will be increased by the integration process and may then add cumulatively every cycle of the wheel 10. This can lead to large errors in the angular position of the rotating wheel 10, which may distort an image displayed on the wheel 10 by an image display system. The angle error can be controlled by using the zero-crossings from filtered data of the accelerometer 20A as reference points for the start and end points of each cycle of the wheel 10.

As shown in FIG. 5, the angle integral of the angular velocity measured by the gyroscopic sensor 20G each cycle using zero-crossings to mark the stand and end points of each cycle leads to angle integrals in a range of 355 degrees to 360 degrees every cycle. The angle error per cycle is found by subtracting the angle integral per cycle from 360 degrees (the true total integrated degrees of each cycle). The angle error per cycle may be kept to less than 5 degrees by using the zero-crossings as reference points for the start and end points of each cycle of the wheel 10. This increases accuracy of the angular position per time and allows for an image display system to display an image on the wheel 10 with reduced distortion.

Figure 6:
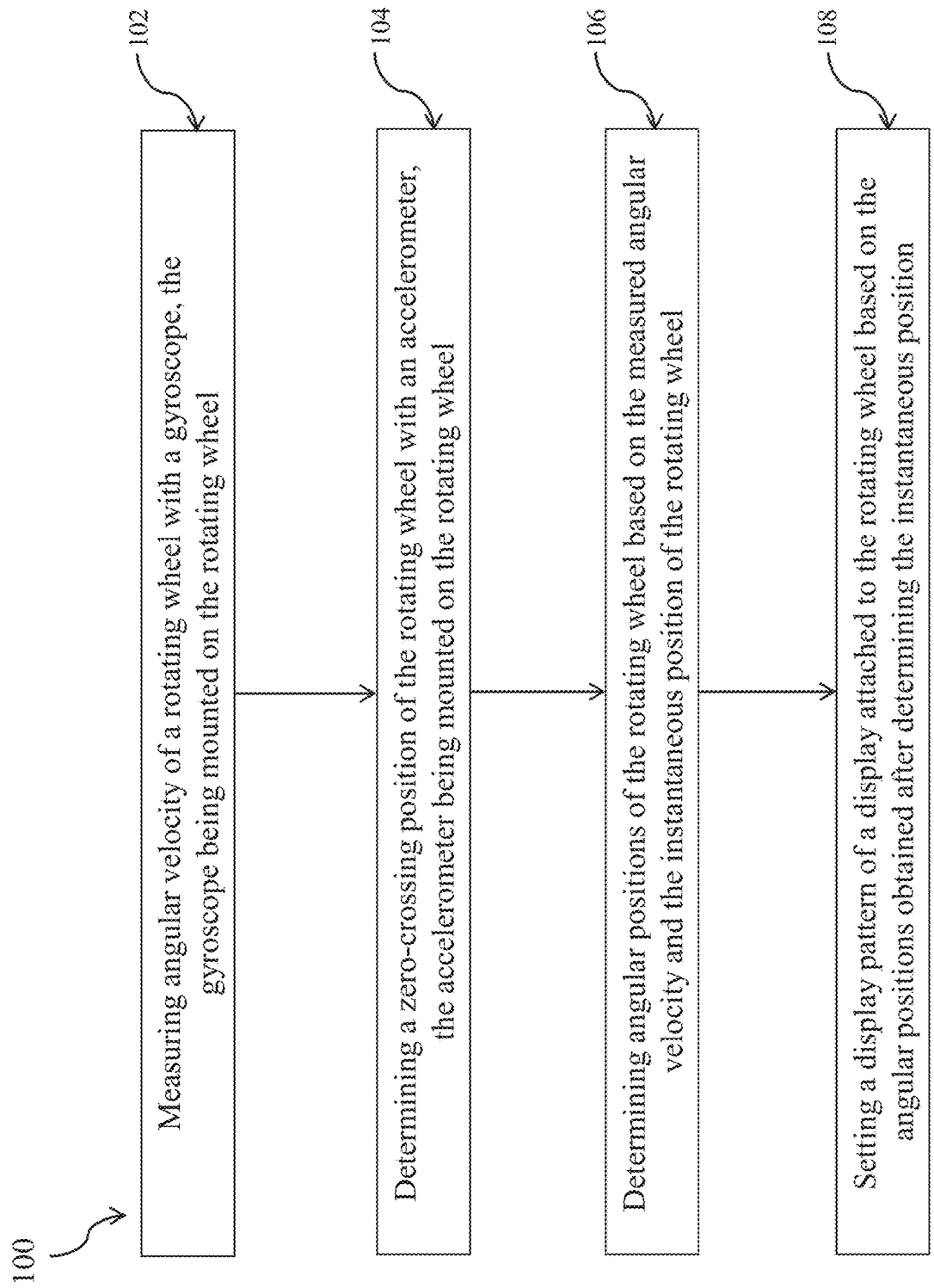
FIG. 6 is a flow chart of a method for determining angular positions for a rotating wheel, in accordance with some embodiments.

FIG. 6 is a flow chart of a method 100 for determining angular positions for a rotating wheel 10 for setting a display pattern of a display attached to the rotating wheel 10, in accordance with some embodiments.

In step 102, the angular velocity of the rotating wheel 10 is measured with a gyroscopic sensor 20G. The gyroscopic sensor 20G is mounted on the rotating wheel 10. This step is further explained below along with FIGS. 8-11.

In step 104, a negative zero-crossing position of the rotating wheel 10 is determined with an accelerometer 20A. The accelerometer 20A is mounted on the rotating wheel 10. This step is further explained below along with FIGS. 8-11.

The start or end points of each cycle of the rotating wheel 10 is determined when the value of acceleration resolved on the rotating plane (e.g., acceleration in the x direction, also referred to as x-acceleration) passes through a zero-crossing. The raw data of the x-acceleration is passed through a low-pass filter (e.g. an infinite impulse response filter) to remove components of the measured x-acceleration from the rotational motion of the wheel 10.

In step 106, angular positions of the rotating wheel 10 are determined in real time based on the angular velocity measured by the gyroscopic sensor 20G and the start or end points of each cycle (revolution) of the rotating wheel 10 determined with the accelerometer 20A. The controller 12 integrates the measurements of the angular velocity measured by the gyroscopic sensor 20G using a zero-crossing determined with the accelerometer 20A as a reference point. Negative zero-crossings, positive zero-crossings, or both negative zero-crossings and positive zero-crossings may be used to determine the instantaneous position of the rotating wheel 10. This step is further explained below along with FIGS. 7-11.

In step 108, a display pattern of a display attached to the rotating wheel 10 is set based on the angular positions obtained after determining the instantaneous position of the rotating wheel 10. The display may include an array of lights 22 mounted on one or more spokes 6 of the rotating wheel 10. The controller 12 may be programmed to determine the display pattern for the array of lights 22 using the instantaneous position of the rotating wheel 10 obtained in step 106. This step is further explained below along with FIGS. 7-8.

FIGS. 7 through 11 illustrate algorithms for an image display system 200, in accordance with some embodiments. The image display system 200 may be implemented as programming of the controller 12 on the wheel 10 (see above, FIG. 1A). However, the image display system may be implemented on any suitable controller or wheel.

Figure 7:
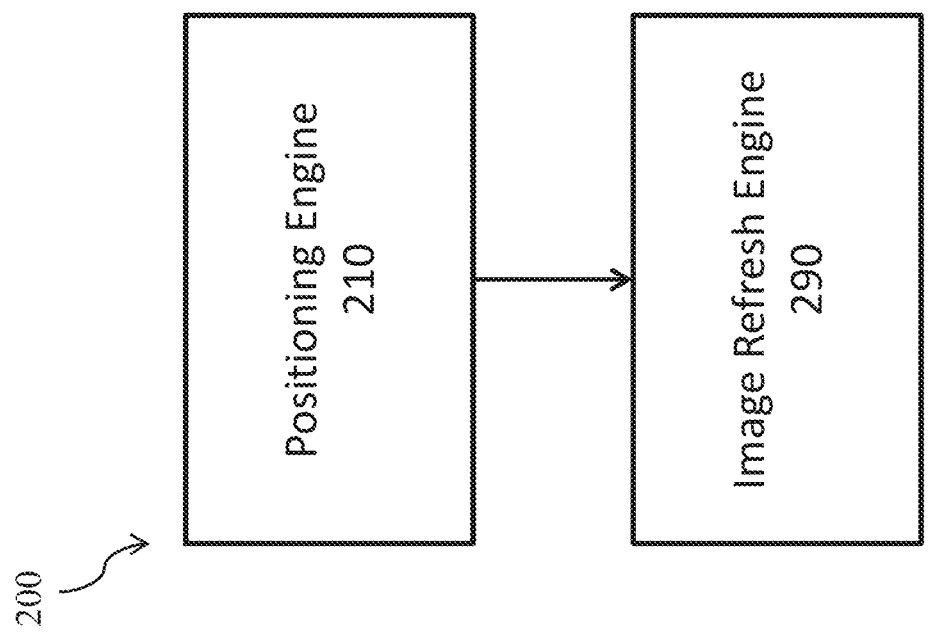
FIG. 7 is a block diagram of an image display system, in accordance with some embodiments.

FIG. 7 illustrates a block diagram of the image display system 200, in accordance with some embodiments. The image display system 200 includes a positioning engine 210 and an image refresh engine 290. In some embodiments, the positioning engine 210 and the image refresh engine 290 are software instructions implemented in a processor (e.g. a CPU). In other embodiments, the positioning engine 210 or the image refresh engine 290 are implemented in hardware (e.g. in an application-specific integrated circuit (ASIC)). The positioning engine 210 determines instantaneous positions of the rotating wheel 10 and uses them to find respective real time positions of the lights of the array of lights 22. The positioning engine 210 then provides the real time positions of the lights of the array of lights 22 as output 250 (see below, FIG. 8) to the image refresh engine 290. Next, the image refresh engine 290 uses the output 250 to update a display pattern of the array of lights 22 in order to display an image on the rotating wheel 10.

Figure 8:
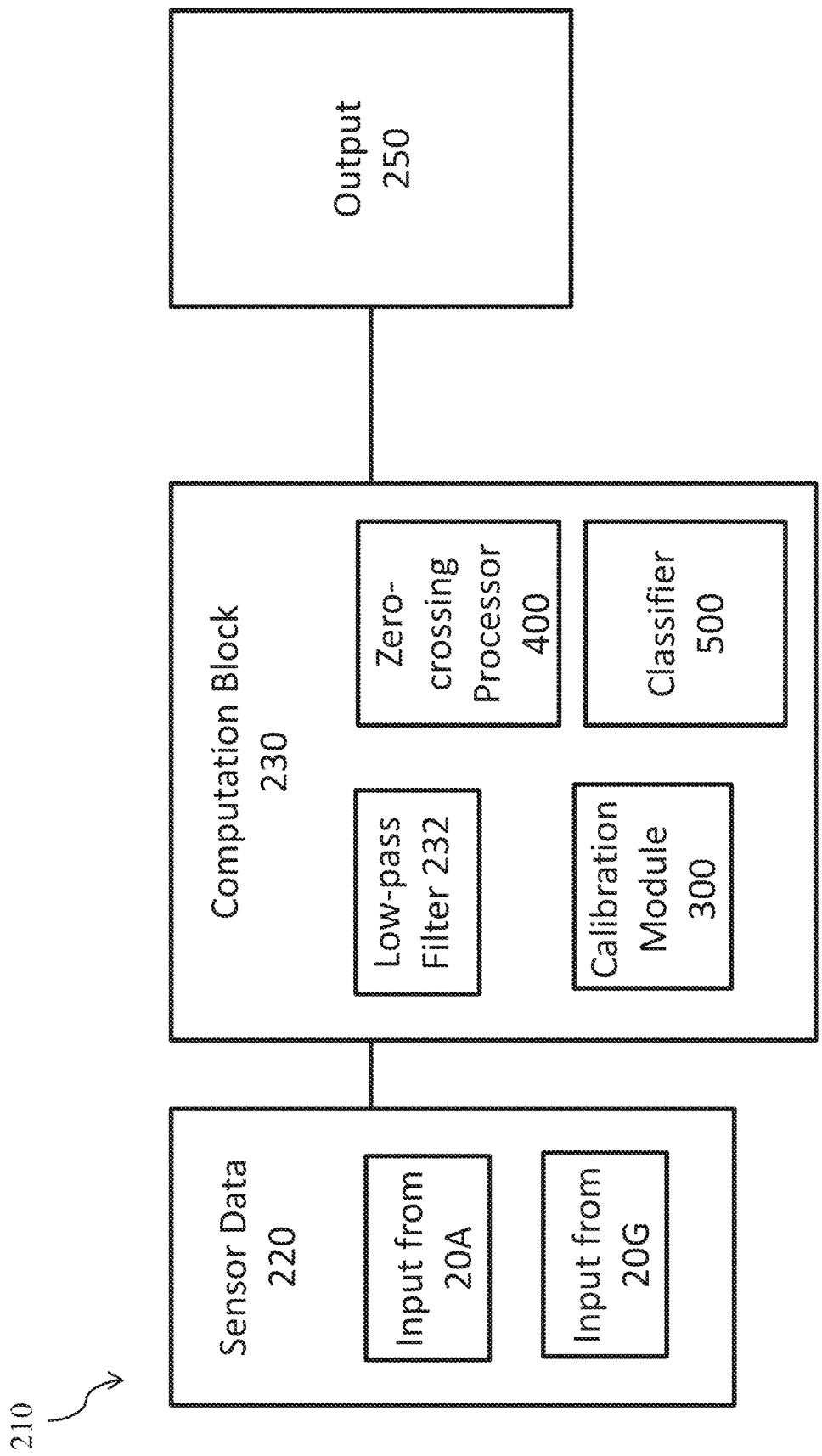
FIG. 8 is a block diagram of a positioning engine, in accordance with some embodiments.

FIG. 8 illustrates a block diagram of the positioning engine 210, in accordance with some embodiments. The positioning engine 210 receives sensor data 220 as input from the sensor 20, including the accelerometer 20A and the gyroscopic sensor 20G and processes the sensor data with a computation block 230. The positioning engine 210 then provides output 250 (e.g., the instantaneous positions of the lights of the array of lights 22) for the image refresh engine 290 (see above, FIG. 7).

The sensor data 220 includes input from the accelerometer 20A and from the gyroscopic sensor 20G. The input from the accelerometer 20A includes instantaneous measurements of the acceleration experienced by the accelerometer 20A in up to three dimensions. The input from the gyroscopic sensor 20G includes measurements of the angular velocity of the rotating wheel 10 with respect to time. The sensor data 220 is subsequently processed by the computation block 230.

The computation block 230 includes programming for processing the sensor data 220, such as a low-pass filter 232, a calibration module 300, a zero-crossing processor 400, and a classifier 500. In some embodiments, the computation block includes a low-pass filter 232, such as an infinite impulse response (IIR) filter. The low-pass filter 232 is used to filter the raw data of the measured x-acceleration and remove higher frequency components in order to extract the sinusoidal signal from gravitational acceleration, as described above with respect to FIG. 4. The calibration module 300 is used to calibrate the sensitivities and bias of the accelerometer 20A and the sensitivities of the gyroscopic sensor 20G, as described below with respect to FIG. 9. The zero-crossing processor 400 is used to process the sensor data 220 until a zero-crossing is reached, as described below with respect to FIG. 10. The classifier 500 checks if the zero-crossings in the processed sensor data are valid, as described below with respect to Figure ii. The computation block 230 then supplies output 250 (e.g., the instantaneous positions of the lights of the array of lights 22) to the image refresh engine 290 in order to update the displayed pattern on the array of lights 22.

Figure 9:
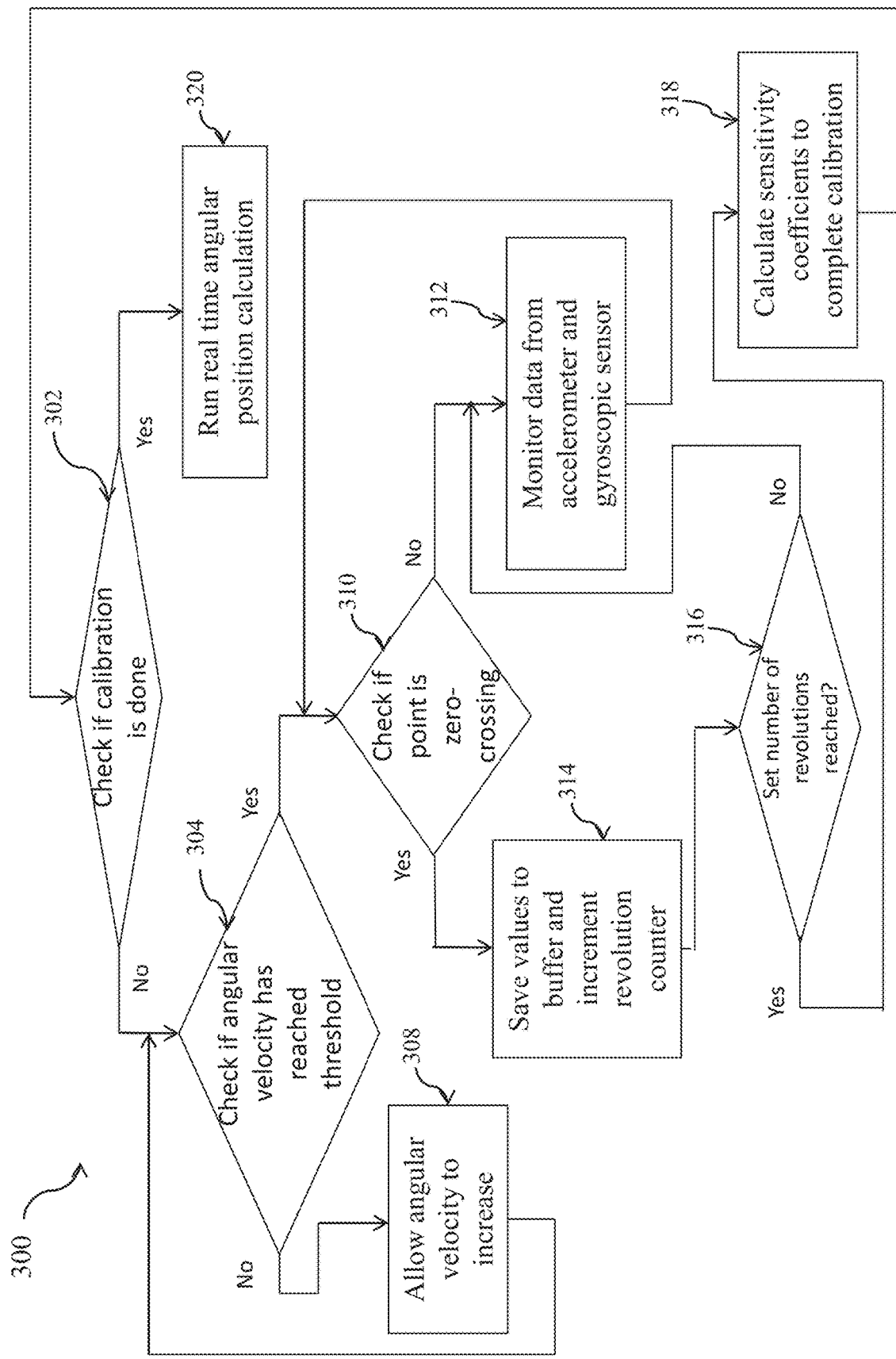
FIG. 9 is a flow chart of an algorithm, in accordance with some embodiments.

FIG. 9 illustrates a flow chart of a calibration module 300, in accordance with some embodiments. The calibration module 300 finds sensitivity coefficients for calibrating data from the accelerometer 20A and the gyroscopic sensor 20G. In some embodiments, the calibration module 300 is run whenever the image display system 200 is started up. In some embodiments, the calibration module 300 is run once when the image display system 200 is first set up on a vehicle, and is not needed to be run again for the same vehicle unless significant adjustments are made to the vehicle (e.g., significant modifications to one or more wheels).

In step 302, at the start of the algorithm, the calibration module 300 checks a calibration process flag to determine if the calibration process is complete. If calibration is not complete, the calibration module 300 proceeds to step 304. If calibration is complete, the calibration module 300 proceeds to step 320.

In step 304, the calibration module 300 checks if the angular velocity of the rotating wheel 10 has reached a set threshold. This is checked because the calibration process may not be accurate if the angular velocity of the wheel 10 is too low. Once the wheel 10 has attained a sufficient angular velocity, e.g. a threshold value of 900 degrees per second (dps), the calibration process may be performed accurately. If the angular velocity has not reached the threshold value, the calibration module 300 proceeds to step 308. If the angular velocity has reached the threshold value, the calibration module 300 proceeds to step 310.

In step 308, the calibration module 300 allows the angular velocity of the rotating wheel 10 to increase, such as by the operator of the vehicle causing the vehicle to accelerate. For example, in the case of a bicycle, the operator may be pedaling the bicycle harder or riding down an inclined surface. The calibration module 300 then returns to step 304 after a preset interval to check if the angular velocity of the rotating wheel 10 has reached the set threshold.

In step 310, the calibration module 300 checks filtered data from the accelerometer 20A to determine if the current time point of the rotating wheel 10 is a zero-crossing. As an example, reaching a negative zero-crossing indicates that a full revolution of the wheel 10 has been completed and another revolution is starting. However, positive zero-crossings may be used to determine the start and end points of revolutions of the wheel 10, or half-revolutions may be found by using positive and negative zero-crossings. If the current time point is not a negative zero-crossing, the calibration module proceeds to step 312. If the current time point is a negative zero-crossing, the calibration module proceeds to step 314.

In step 312, the calibration module 300 monitors filtered data from the accelerometer 20A and angular velocity data from the gyroscopic sensor 20G. The calibration module 300 records maxima and minima of the filtered x-acceleration and calculates the integral of the angular velocity from the beginning of the latest revolution (measured from the last zero-crossing). After each new time sample, the calibration module 300 returns to step 310 to check for a negative zero-crossing.

In step 314, reaching a negative zero-crossing indicates that a revolution of the wheel 10 has been completed. The calibration module 300 saves the maximum and minimum values of the filtered x-acceleration and the integrated angular velocity of the revolution to a buffer. The calibration module 300 then increases a counter of the number of revolutions of the wheel 10 since the initialization of the calibration process (e.g., at step 304) and proceeds to step 316.

In step 316, the calibration module 300 checks if the counter of the number of revolutions completed has reached a preset number, e.g. 10 revolutions. If the preset number of revolutions has not been reached, the calibration module 300 returns to step 312 for the next revolution of the wheel 10. If the preset number of revolutions has been reached, the calibration module 300 proceeds to step 318.

In step 318, the calibration module 300 calculates sensitivity coefficients for the accelerometer 20A and the gyroscopic sensor 20G. The sensitivity coefficients are used to adjust for respective scale errors of the accelerometer 20A and the gyroscopic sensor 20G. The sensitivity coefficients are calculated by averaging over the recorded maximum and minimum values of the filtered x-acceleration and the integrated angular velocity of the revolution saved to the buffer for each revolution of the wheel 10.

The recorded maximum and minimum values of the filtered x-acceleration are summed over the revolutions of the wheel 10 performed in the calibration process and divided by the total number of revolutions. The average maximum and minimum values are then used to compute a sensitivity coefficient for the accelerometer 20A to correct for scale error. For example, if the average maximum value of the filtered x-acceleration is 0.9000 and the average minimum value of the filtered x-acceleration is −0.9000, then the sensitivity coefficient for the accelerometer 20A is $(1.000-(-1.000))/(0.9000-(-0.9000))$=about 1.111. The sensitivity coefficient (e.g., 1.111) is saved and used by the computation block 230 to scale the measured values of the x-acceleration to their proper values in a range of −1.0 to +1.0.

The integrated angular velocities of the gyroscopic sensor 20G are summed over the revolutions of the wheel 10 performed in the calibration process and divided by the total number of revolutions. The average integrated angular velocity is then used to compute a sensitivity coefficient for the gyroscopic sensor 20G to correct for scale error. For example, if the average integrated angular velocity is 370 degrees, then the sensitivity coefficient for the gyroscopic sensor 20G is 360/370=about 0.97. The sensitivity coefficient (e.g., 0.97) is saved and used by the computation block 230 to scale the measured values of the angular velocity to their proper values so that the integrated angular velocity is about 360 degrees.

Once the sensitivity coefficients are calculated, the calibration module 300 sets the computation block 230 to scale the filtered x-acceleration from the accelerometer 20A and the angular velocity measurements from the gyroscopic sensor 20G by the respected sensitivity coefficients for the accelerometer 20A and the gyroscopic sensor 20G. A flag is set indicating that the calibration process is complete, and the calibration module returns to step 302.

In step 320, the calibration process is complete and real time angular position calculation may begin. The calibration module 300 ends running and the computation block 230 begins running the zero-crossing processor 400.

Figure 10:
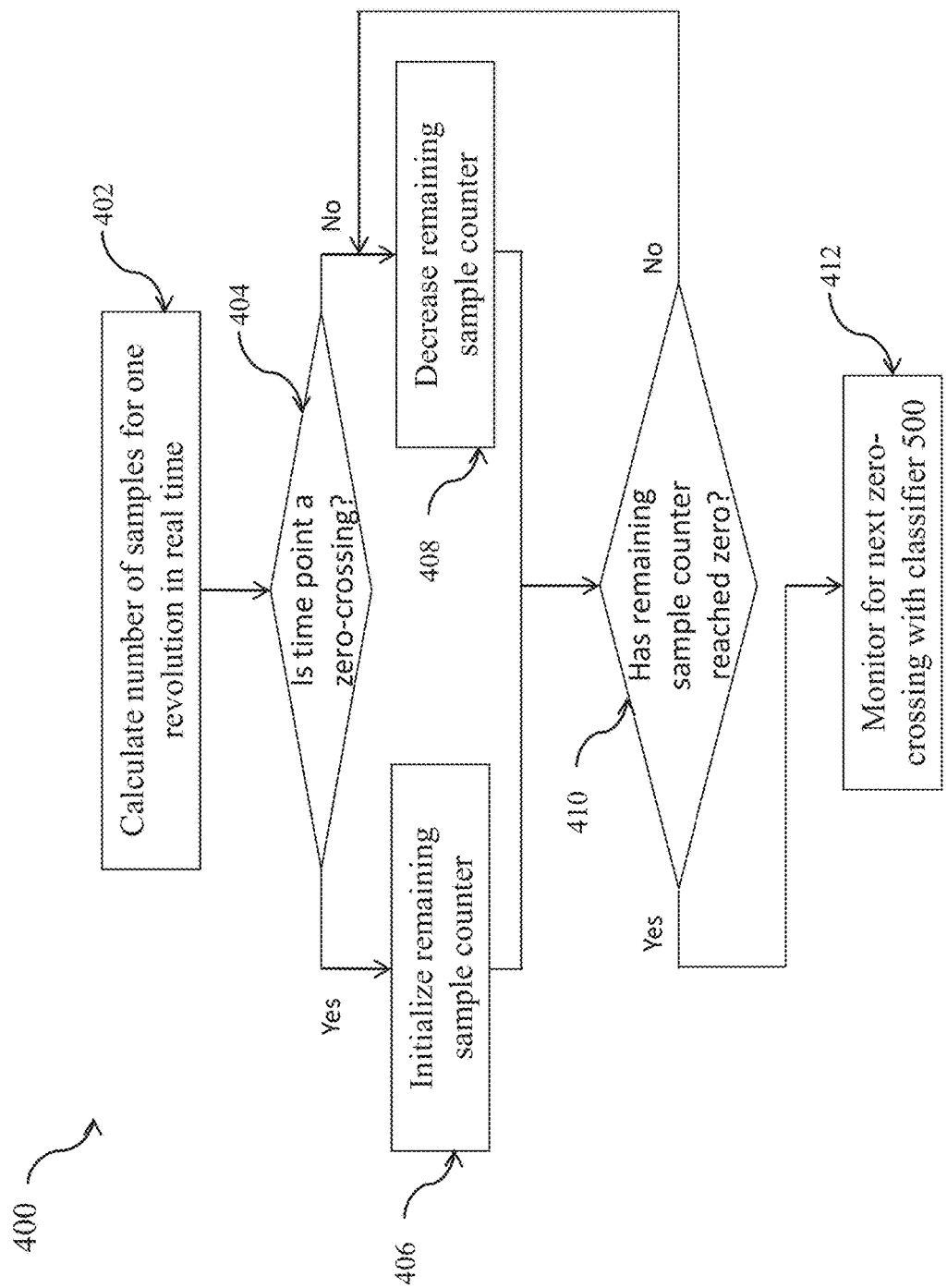
FIG. 10 is a flow chart of an algorithm, in accordance with some embodiments.

FIG. 10 illustrates a flow chart of the zero-crossing processor 400, in accordance with some embodiments. The zero-crossing processor 400 determines when zero-crossings should be tested for by the classifier 500 (see below, Figure ii) for every revolution of the wheel 10. The zero-crossing processor 400 receives input data from the accelerometer 20A (e.g., filtered x-acceleration) and from the gyroscopic sensor 20G (e.g., angular velocity measurements) in real time.

In step 402, at the start of a new revolution of the wheel 10, the zero-crossing processor 400 calculates the number of time samples for one revolution of the wheel 10 in real time. In some embodiments, the zero-crossing processor 400 assumes that the wheel 10 is rotating at a constant angular velocity as an approximation from the instantaneous angular velocity measured by the gyroscopic sensor 20G. The zero-crossing processor 400 calculates the expected period for the next revolution of the wheel 10 by dividing a full rotation by the instantaneous angular velocity. As an example, when the instantaneous angular velocity of the wheel 10 is 60 degrees per second (dps), the expected period would be 360 degrees divided by 60 dps, which is 6 seconds. Next, the zero-crossing processor 400 multiplies the expected period by the output data rate of the gyroscopic sensor 20G to find the number of time samples in the next revolution of the wheel 10. For example, if the output data rate is 416 Hz and the expected period is 6 seconds, the number of time samples in the next revolution of the wheel 10 is 2496 samples.

Next, in step 404, the zero-crossing processor 400 checks if the current time point is a valid zero-crossing (e.g., a negative zero crossing in embodiments where negative zero-crossings are used as reference points). This may be done by calling the classifier 500 (see below, Figure ii). If the current time point is a zero-crossing, the zero-crossing processor proceeds to step 406. If the current time point is not a zero-crossing, the zero-crossing processor proceeds to step 408.

In step 406, the zero-crossing processor 400 initializes a counter of remaining time samples, which is set to the total number of time samples in the next revolution of the wheel 10 multiplied by a gain factor that is less than one. The counter of remaining time samples is used to count down until near the end of the revolution of the wheel 10, at which point the zero-crossing processor 400 will begin monitoring for the next zero-crossing. For example, if the total number of time samples is 2496 and the gain factor is 0.75, then the counter of remaining time samples will be initialized to 1857. The zero-crossing processor 400 then proceeds to step 410.

In step 408, the counter of remaining time samples is decreased by one as another time sample is received from the gyroscopic sensor 20G. The zero-crossing processor 400 then proceeds to step 410.

In step 410, the zero-crossing processor 400 checks if the counter of remaining time samples has reached zero. If the counter of remaining time samples is still greater than zero, then the zero-crossing processor 400 returns to step 408. If the counter of remaining time samples is zero, then the zero-crossing processor 400 proceeds to step 412.

In step 412, the zero-crossing processor 400 begins actively monitoring for the next zero-crossing in the filtered data from the accelerometer 20A. This continues until the next zero-crossing candidate is found and validated by the classifier 500.

Figure 11:
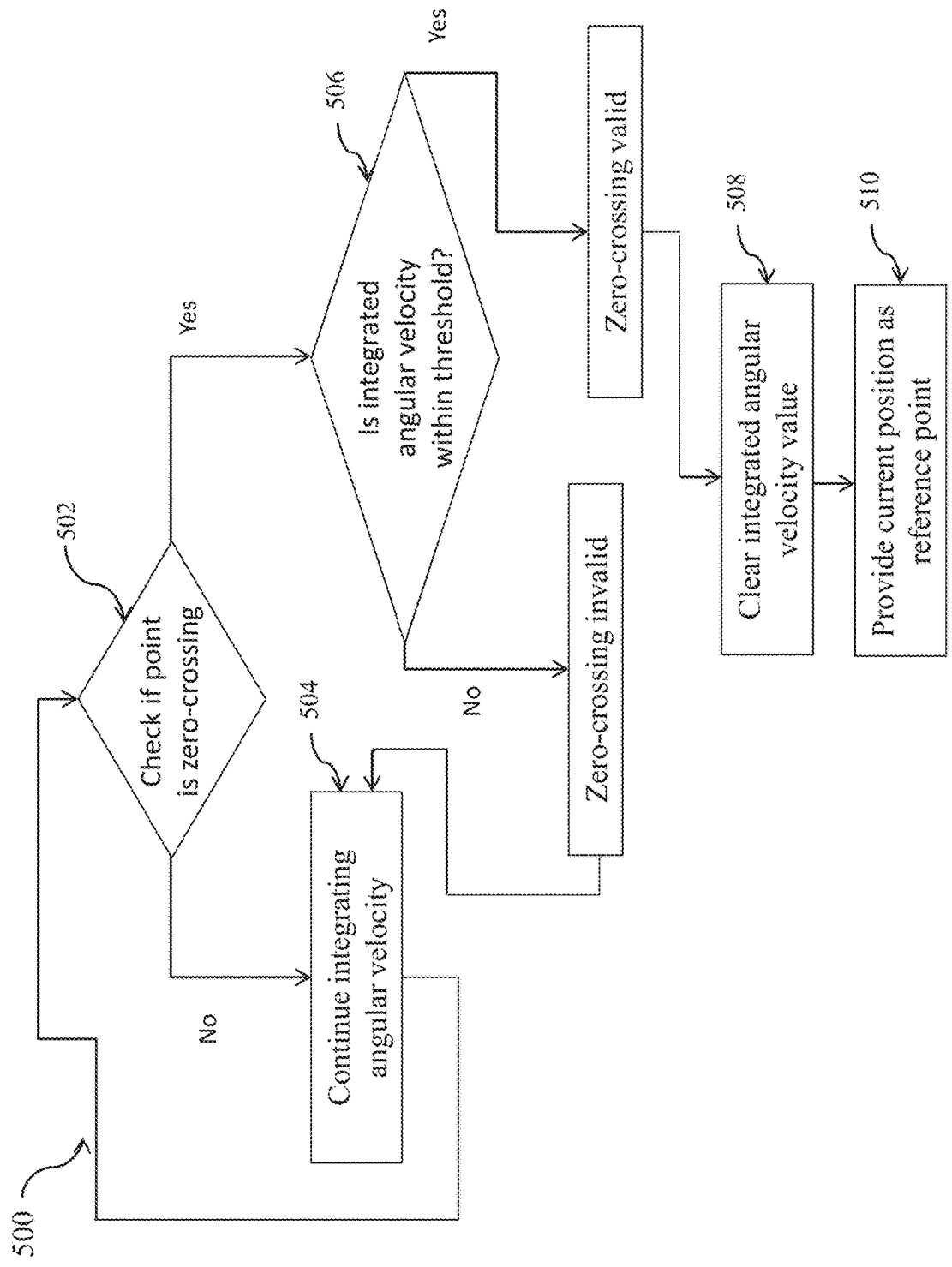
FIG. 11 is a flow chart of an algorithm, in accordance with some embodiments.

FIG. 11 illustrates a flow chart of the classifier 500, in accordance with some embodiments. The classifier 500 determines if a zero-crossing found from filtered data of the accelerometer 20A is within a threshold of integrated angular velocity measurements from the gyroscopic sensor 20G. This check of validity of the zero-crossings may be necessary due to the possibility of jitter or noise remaining in the filtered data of the accelerometer 20A. In some embodiments, the threshold is a range of 355 degrees to 360 degrees for one revolution of the wheel 10. If the zero-crossing is found when the integrated angular velocity is not within the threshold, the zero-crossing is invalid and the integration of angular velocity measurements continues until a valid zero-crossing is found. If the zero-crossing is found when the integrated angular velocity is within the threshold, then the zero-crossing is valid and the sum of integrated angular velocity measurements is cleared. The zero-crossing then becomes the starting reference point for the integration of angular velocities of the next revolution of the wheel 10.

In step 502, the filtered data of the accelerometer 20A is checked to determine if a zero-crossing has been reached. For example, the filtered x-acceleration may be checked to determine if the sign of the filtered x-acceleration has changed from positive to negative, which indicates a negative zero-crossing. If a zero-crossing is not found, then the algorithm proceeds to step 504. If a zero-crossing is found, then the algorithm proceeds to step 506.

In step 504, control is returned to the zero-crossing processor 400. The angular velocity measurements from the gyroscopic sensor 50G continue to be integrated, and at every new time sample, the algorithm returns to step 502 and checks for a zero-crossing.

In step 506, the integrated angular velocity measurements from the gyroscopic sensor 20G are checked to see if they are within a threshold (e.g., in a range of 355 degrees to 360 degrees). If the integrated angular velocity measurements are not within the threshold, the zero-crossing is invalid and the algorithm proceeds to step 504. If the integrated angular velocity measurements are within the threshold, the zero-crossing is valid and the algorithm proceeds to step 508.

In step 508, the integrated angular velocity is cleared (reset to zero). The valid zero-crossing indicates that the wheel 10 has completed a revolution and its angular position is known. The algorithm proceeds to step 510, in which the current position of the wheel 10 at the zero-crossing is provided as a reference point. After step 510, the operation of the classifier 500 may be complete and control may be returned to the zero-crossing processor 400. Angular velocity measurements from the gyroscopic sensor 20G are subsequently integrated again to find the angular position of the wheel 10 at subsequent times after the zero-crossing.

In some embodiments, negative zero-crossings are used as reference points for full revolutions of the wheel 10. In some embodiments, positive zero-crossings are used as reference points for full revolutions of the wheel 10. In some embodiments, negative zero-crossings and positive zero-crossings are both used as reference points for half revolutions of the wheel 10, and the threshold for the integrated angular velocity measurements of step 506 is chosen to be appropriate for a half revolution (e.g, in a range of 177.5 degrees to 180 degrees).

Example embodiments of the disclosure are summarized here. Other embodiments can also be understood from the entirety of the specification as well as the claims filed herein.

Example 1. A method of processing information of a rotating wheel, the method including: measuring angular velocity of a rotating wheel with a gyroscopic sensor, the gyroscopic sensor being mounted on the rotating wheel; determining an instantaneous position of the rotating wheel with an accelerometer, the accelerometer being mounted on the rotating wheel; and determining the angular positions of the rotating wheel based on the measured angular velocity and the instantaneous position of the rotating wheel.

Example 2. The method of example 1, where determining the instantaneous position of the rotating wheel includes: measuring, at the accelerometer, instantaneous values of acceleration along a first direction and a second direction perpendicular to the first direction; determining, from the measured instantaneous values, a value of acceleration resolved on a rotating plane of the rotating wheel, the rotating plane including the first and the second directions; and determining the instantaneous position of the rotating wheel when the value of acceleration resolved on the rotating plane passes through a zero-crossing.

Example 3. The method of example 2, where determining the instantaneous position of the rotating wheel is performed when the value of acceleration resolved on the rotating plane passes through a negative zero-crossing.

Example 4. The method of example 2, where determining the instantaneous position of the rotating wheel is performed when the value of acceleration resolved on the rotating plane passes through a positive zero-crossing.

Example 5. The method of example 2, further including filtering instantaneous values of acceleration of the accelerometer with a low pass filter.

Example 6. The method of example 1, where the rotating wheel is a wheel of a bicycle.

Example 7. The method of example 1, further including: based on the angular positions obtained after determining the instantaneous position, setting a display pattern of a display attached to the rotating wheel.

Example 8. The method of example 7, where the display includes an array of light emitting circuits.

Example 9. A vehicle including: a wheel configured to be rotated; a gyroscopic sensor coupled to the wheel; an accelerometer coupled to the wheel; and a controller connected to the gyroscopic sensor and the accelerometer, where the controller is configured to: take measurements of an angular velocity of the wheel with respect to time using the gyroscopic sensor; take measurements of gravitational acceleration of the wheel with respect to time using the accelerometer; and calculate an angular position of the wheel using the measurements of the angular velocity of the wheel with respect to time, where the controller corrects an angle error in the measurements of the angular position using the measurements of the gravitational acceleration of the wheel.

Example 10. The vehicle of example 9, where the gyroscopic sensor and the accelerometer are part of an inertial measurement unit.

Example 11. The vehicle of example 9, further including an array of light emitting circuits coupled to the wheel.

Example 12. The vehicle of example 11, where the controller is configured to display an image with the array of light emitting circuits when the wheel is rotating.

Example 13. The vehicle of example 9, where the vehicle is free of magnetic sensors.

Example 14. The vehicle of example 9, where the controller correcting the angle error includes the controller being programmed to use a zero-crossing in the measurements of the gravitational acceleration of the wheel to find an instantaneous position of the wheel.

Example 15. The vehicle of example 14, where the controller is programmed to use a negative zero-crossing to find the instantaneous position of the wheel.

Example 16. The vehicle of example 14, where the controller is programmed to use a positive zero-crossing to find the instantaneous position of the wheel.

Example 17. The vehicle of example 14, where the controller is programmed to control the angle error to be within 5 degrees.

Example 18. A display including: a wheel configured to be rotated around an axis perpendicular to a rotating plane; a plurality of light emitting circuits attached to the wheel; a gyroscopic sensor mounted on the wheel and configured to measure angular velocity of the wheel while the wheel is being rotated; an accelerometer mounted on the wheel and configured to measure acceleration of the wheel while the wheel is being rotated; and a controller programmed to: determine zero-crossings of a value of the acceleration resolved along the rotating plane; determine the angular position of the wheel based on the measured angular velocity and the zero-crossings; and set a display property of the plurality of light emitting circuits based on the angular position.

Example 19. The display of example 18, where the controller is further programmed to use a low-pass filter on measurements of acceleration from the accelerometer.

Example 20. The display of example 18, where the controller is further programmed to use negative zero-crossings as starting points for determining the angular position of the wheel.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A method of processing information of a rotating wheel, the method comprising:
measuring angular velocity of a rotating wheel with a gyroscopic sensor, the gyroscopic sensor being mounted on the rotating wheel;

determining an instantaneous position of the rotating wheel with an accelerometer using a zero-crossing, the accelerometer being mounted on the rotating wheel, wherein determining the instantaneous position of the rotating wheel comprises:
   measuring, at the accelerometer, instantaneous values of acceleration along a first direction and a second direction perpendicular to the first direction;
   determining, from the measured instantaneous values, a value of acceleration resolved on a rotating plane of the rotating wheel, the rotating plane comprising the first and the second directions; and
   determining the instantaneous position of the rotating wheel when the value of acceleration resolved on the rotating plane passes through the zero-crossing; and
   determining the angular positions of the rotating wheel based on the measured angular velocity and the instantaneous position of the rotating wheel.

2. The method of claim 1, wherein determining the instantaneous position of the rotating wheel is performed when the value of acceleration resolved on the rotating plane passes through a negative zero-crossing.

3. The method of claim 1, wherein determining the instantaneous position of the rotating wheel is performed when the value of acceleration resolved on the rotating plane passes through a positive zero-crossing.

4. The method of claim 1, further comprising filtering instantaneous values of acceleration of the accelerometer with a low pass filter.

5. The method of claim 1, wherein the rotating wheel is a wheel of a bicycle.

6. The method of claim 1, further comprising:
   based on the angular positions obtained after determining the instantaneous position, setting a display pattern of a display attached to the rotating wheel.

7. The method of claim 6, wherein the display comprises an array of light emitting circuits.

8. The method of claim 1, wherein measuring the instantaneous values of acceleration further comprises using an infinite impulse response filter.

9. A vehicle comprising:
   a wheel configured to be rotated;
   a gyroscopic sensor coupled to the wheel;
   an accelerometer coupled to the wheel; and
   a controller connected to the gyroscopic sensor and the accelerometer, wherein the controller is configured to:
      take measurements of an angular velocity of the wheel with respect to time using the gyroscopic sensor;
      take measurements of gravitational acceleration of the wheel with respect to time using the accelerometer; and
      calculate an angular position of the wheel using the measurements of the angular velocity of the wheel with respect to time, wherein the controller corrects an angle error in the measurements of the angular position using a zero crossing in the measurements of the gravitational acceleration of the wheel to find an instantaneous position of the wheel, the controller being programmed to control the angle error to be within 5 degrees.

10. The vehicle of claim 9, wherein the gyroscopic sensor and the accelerometer are part of an inertial measurement unit.

11. The vehicle of claim 9, further comprising an array of light emitting circuits coupled to the wheel.

12. The vehicle of claim 11, wherein the controller is configured to display an image with the array of light emitting circuits when the wheel is rotating.

13. The vehicle of claim 9, wherein the vehicle is free of magnetic sensors.

14. The vehicle of claim 9, wherein the controller is programmed to use a negative zero-crossing to find the instantaneous position of the wheel.

15. The vehicle of claim 9, wherein the controller is programmed to use a positive zero-crossing to find the instantaneous position of the wheel.

16. The vehicle of claim 9, wherein the vehicle is a bicycle.

17. The vehicle of claim 9, wherein the gyroscopic sensor and the accelerometer are part of an inertial measurement unit.

18. A display comprising:
   a wheel configured to be rotated around an axis perpendicular to a rotating plane;
   a plurality of light emitting circuits attached to the wheel;
   a gyroscopic sensor mounted on the wheel and configured to measure angular velocity of the wheel while the wheel is being rotated;
   an accelerometer mounted on the wheel and configured to measure acceleration of the wheel while the wheel is being rotated; and
   a controller programmed to:
      determine zero-crossings of a value of the acceleration resolved along the rotating plane;
      determine the angular position of the wheel based on the measured angular velocity and the zero-crossings; and
      set a display property of the plurality of light emitting circuits based on the angular position.

19. The display of claim 18, wherein the controller is further programmed to use a low-pass filter on measurements of acceleration from the accelerometer.

20. The display of claim 18, wherein the controller is further programmed to use negative zero-crossings as starting points for determining the angular position of the wheel.

* * * * *